United States Patent
Maeno et al.

(10) Patent No.: US 7,585,422 B2
(45) Date of Patent: Sep. 8, 2009

(54) OPTICAL ELEMENT MANUFACTURING METHOD

(75) Inventors: Yoshinori Maeno, Tokyo (JP); Daisuke Shimura, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 625 days.

(21) Appl. No.: 11/374,117

(22) Filed: Mar. 14, 2006

(65) Prior Publication Data

US 2006/0201199 A1    Sep. 14, 2006

(30) Foreign Application Priority Data

Mar. 14, 2005   (JP)   ............... 2005-071488

(51) Int. Cl.
*B29D 11/00* (2006.01)

(52) U.S. Cl. .............. 216/26; 216/80; 438/29; 438/753

(58) Field of Classification Search ........... 216/26, 216/80; 438/29, 30, 31, 745
See application file for complete search history.

(56) References Cited

U.S. PATENT DOCUMENTS

| | | | | |
|---|---|---|---|---|
| 6,503,384 B1 * | 1/2003 | Teshima et al. | ............ | 205/118 |
| 7,166,537 B2 * | 1/2007 | Jacobsen et al. | ............ | 438/720 |
| 2002/0100859 A1 * | 8/2002 | Yagi et al. | .................. | 249/111 |
| 2005/0157396 A1 * | 7/2005 | Teshima et al. | ............ | 359/619 |

FOREIGN PATENT DOCUMENTS

JP     2003-161811     6/2003

OTHER PUBLICATIONS

Journal of Japan Institute of Electronics Packaging, vol. 5, No. 5, Aug. 2002, pp. 466-471.
Journal of Japan Institue of Electronics Packaging, vol. 5, No. 5, Aug. 2002, pp. 466-472.

* cited by examiner

*Primary Examiner*—Lan Vinh
(74) *Attorney, Agent, or Firm*—Venable LLP; Michael A. Sartori; Justine A. Gozzi

(57) ABSTRACT

A new and improved optical element manufacturing method, through which lens elements can be efficiently mounted on a silicon V-shaped groove substrate at lower manufacturing costs, is provided. The method comprises a lens element forming step in which an oxide layer 104 is formed at a supporting layer 102 and lens elements 120 are formed at the upper surface of the silicon oxide film, a coating step in which a solder connection metal film is coated onto the side surfaces of the lens elements and a separating step in which the lens elements are separated by removing the silicon oxide film. Through this method, the solder connection metal film can be formed with ease at the sidewalls of the lens elements. The lens elements with the solder connection metal film formed at the side walls thereof can easily be soldered onto a supporting substrate.

22 Claims, 8 Drawing Sheets

OPTICAL ELEMENT MANUFACTURING METHOD

CROSS REFERENCE TO RELATED APPLICATION

The disclosures of Japanese Patent Application No. JP 2005-71488, filed Mar. 14, 2005, entitled "Optical Element Manufacturing Method". The contents of that application are herein incorporated by reference in their entirety.

BACKGROUND OF THE INVENTION

The present invention relates to a method for manufacturing an optical element to be used as a device in a communication apparatus or a computer.

DESCRIPTION OF THE RELATED ART

Microlenses and micro-optical elements constituted with diffractive optical elements are used as optical components in optical disk player devices for playing CDs or the like and optical communication devices. Such diffractive optical elements assume a cylindrical shape or a semicylindrical shape and are manufactured by repeating a cycle made up of a photolithography process and an etching step a few times (see, for instance, Electronics Mounting Journal Vol. 5 No. 5 (2002) p.p. 466-472). The size of these microlenses and micro optical elements is in the range of 100 μm to several hundred μm×100 μm to several hundred μm.

The microlenses are manufactured by using a standard silicon wafer or an SOI (silicon-on-insulator) wafer often used in LSI production. Before the aggregate substrate is separated into individual lenses, the rear surface of the substrate is polished or in the case of an SOI wafer, the oxide film layer is removed through etching. Once the rear surface is removed, the aggregate is separated into bars of lenses detached from each other at a substantially middle area between the individual lenses. They are then used as microlenses (see, for instance, Japanese Laid Open Patent Publication No. 2003-161811).

When mounting such lens elements on a V-shaped groove in a silicon substrate (hereafter referred to as a silicon V-shaped groove substrate), the lens elements each need to be fixed onto the silicon V-shaped groove substrate with an adhesive or with solder. While it is necessary to deposit a metal having an affinity with solder at the lens side surface if the lens element is to be soldered onto the substrate, it is an extremely time consuming to form a metal film at one lens at a time, through vacuum deposition or the like at the lens side surfaces ranging over an extremely small area of approximately several hundred μm and, in reality, formation of such small metal areas at the lens side surface is not a viable proposition. In addition, while the lens elements are normally mounted on the silicon V-shaped groove substrate by using a flip chip bonder or the like, there is a great deal of interest in methods through which the lens element can be mounted with better accuracy at lower mounting cost.

SUMMARY OF THE INVENTION

An object of the present invention, which has been completed by addressing the problems of the related art discussed above, is to provide a new and improved optical element manufacturing method through which lens elements can be efficiently mounted onto a silicon V-shaped substrate while lowering the manufacturing costs.

The present invention achieves the object described above by providing an optical element manufacturing method comprising a lens element forming step in which a first silicon oxide film is formed on a first silicon substrate and lens elements are formed at an upper surface of the first silicon oxide film, a coating step in which a solder connection metal film is coated onto side surfaces of the lens elements and a separating step in which the lens elements are separated by removing the first silicon oxide film.

Through this manufacturing method, a solder connection metal film can easily be formed at the sidewall of each lens element. With the solder connection metal film formed at the sidewall of the lens element, the lens element can now be mounted onto a substrate through soldering. Namely, when fixing the lens element at the supporting substrate, it can be firmly set onto the supporting substrate through soldering with ease.

The lens element forming step may include a step for forming a second silicon substrate on the first silicon oxide film, a step for forming lens portions at an upper surface of the second silicon substrate and a step for forming the lens elements by etching the second silicon substrate. By executing these steps, the lens elements (microlens array) can be formed with ease on the first silicon substrate.

A step for forming a second silicon oxide film at upper surfaces of the lens element may be executed between the lens element forming step and the coating step and, in such a case, the first silicon oxide film and the second silicon oxide film should be removed through the separating step. By forming the second silicon oxide film at the upper surface of the lens elements, i.e., at the surface where the lens portions are formed, it is ensured that the solder connection metal does not become adhered onto the lens portions. Then, as described above, the second silicon oxide film can be removed together with the first silicon oxide film through the separating step.

The solder connection metal may be a metal that is not corroded by hydrofluoric acid. Such a solder connection metal will not be adversely affected even if hydrofluoric acid is used during the separating step.

The coating step may be executed by adopting any of various methods including those described below. In a first method, the solder connection metal may be applied through vapor deposition. In other words, the solder connection metal can be coated only onto a specific surface (side wall) of each lens element through vapor deposition such as ion coating.

The solder connection metal deposited through vapor deposition may be, for instance, a metal material constituted of, for instance, Cu (0.2 μm)/Ni (0.1 μm) and Ni 80 Cr 20 (0.2 μm)/Ni (0.1 μm) (claim 6). The metal material constituted of Cu (0.2 μm)/Ni (0.1 μm) and Ni 80 Cr 20 (0.2 μm)/Ni (0.1 μm) demonstrates a sufficiently high level of resistance to a hydrofluoric acid solution (HF solution) and also assures a sufficient level of solder bonding strength.

As a second method, the coating step may be executed by electrolessly plating the solder connection metal. Through electroless plating, a metal film can be formed evenly over the entire side wall and thus, even if the side walls of the lens elements having been formed are set next to each other, the solder connection metal can be formed at the side walls of the individual lens elements as long as the side walls are formed at a distance large enough to allow full penetration of the plating solution. Thus, lens elements can be formed at the silicon substrate at high density.

The solder connection metal to be electrolessly plated may be a metal material constituted of Cu (0.5 μm)/Ni (0.1 μm). The metal material constituted of Cu (0.5 μm)/Ni (0.1 μm) demonstrates a sufficiently high level of resistance to a hydrofluoric acid solution (HF solution) and also assures a sufficiently high level of solder bonding strength.

As a third method, the coating step may be executed by electrolytically plating the solder connection metal. Through electrolytic plating, the solder connection metal can be formed evenly only over an area where an electrical current flows. This means that the extent to which the lens elements are affected by the presence of the solder connection metal is minimized. In addition, even if the sidewalls of the lens elements having been formed are set next to each other, the solder connection metal can be formed at the sidewalls of the individual lens elements as long as the sidewalls are formed at a distance large enough to allow full penetration of the plating solution. Thus, lens elements can be formed at the silicon substrate at high density.

The solder connection metal to be electrolytically plated may be a metal material constituted of Cu (0.5 μm)/Ni (0.2 μm). The metal material constituted of Cu (0.5 μm)/Ni (0.2 μm) demonstrates a sufficiently high level of resistance to a hydrofluoric acid solution (HF solution) and also assures a sufficiently high level of solder bonding strength.

The method may further include a step for forming at a supporting substrate fixing grooves at which lens elements are to be fixed, a step for forming solder at the fixing grooves and a lens element fixing step for fixing the lens element at the fixing grooves. In this case, fix portions assuming a shape matching the shape of the fixing grooves may be formed at the lens elements during the lens element forming step. The lens elements formed through these steps can be mounted with ease at the supporting substrate via the solder. It is to be noted that the fixing grooves may adopt any shape as long as its shape matches the shape of the fix portions at the lens elements, and it may assume, for instance, a recessed shape.

During the lens element fixing step, the lens elements and the fixing grooves at the supporting substrate may be immersed in a solution so as to let the fix portions of the lens elements be fixed (otherwise referred to as "positioned", "fitted", "set" or "mounted") at the fixing grooves through in-solution self alignment. In this case, a great number of lens elements can be fixed onto the supporting substrate all at once.

The fix portions at each lens element may be formed asymmetrically relative to the center of the lens element. Such asymmetrical fix portions make it possible to accurately set and fix lenses in a batch by ensuring that the lens elements are not erroneously positioned back to front. It is to be noted that the fix portions being asymmetrical relative to the center of the lens element assume shapes different from each other when viewed from the front or the rear of the lens element and such asymmetrical fix portions may be achieved by forming the left-side fix portion and the right-side fix portion of the lens element with different shapes by forming the left and right fix portions at unmatched positions or by forming a fix portion only on the left side or the right side.

DETAILED DESCRIPTION OF THE PREFERRED EMBODIMENTS

Figure 1A:
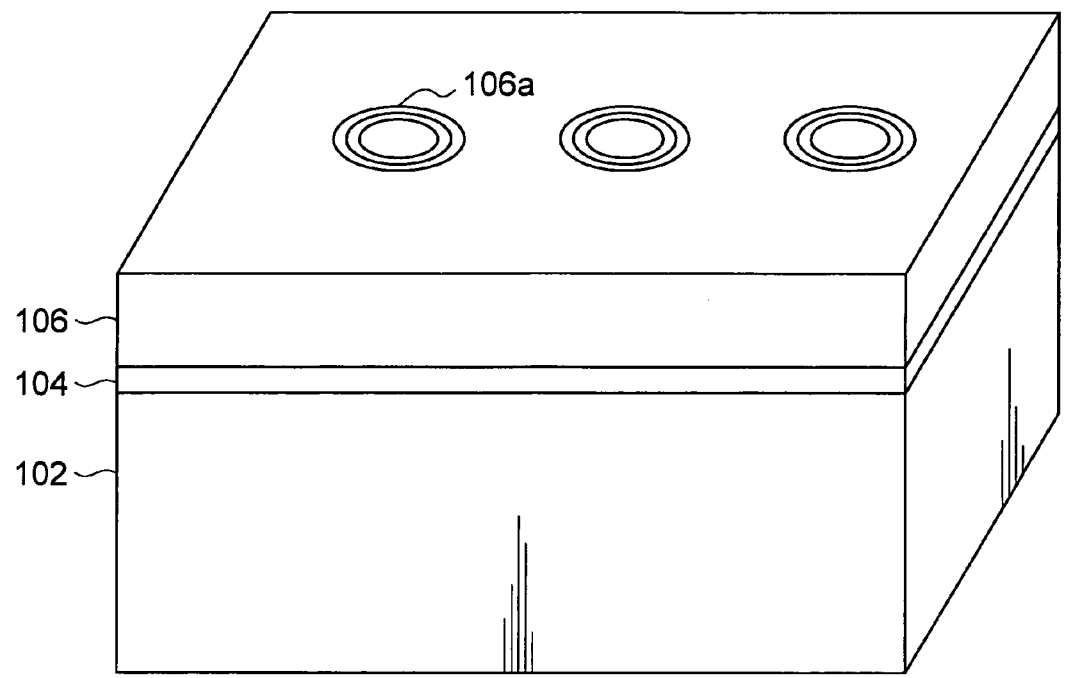
FIG. 1 illustrates the optical element manufacturing method achieved in a first embodiment.

The following is a detailed explanation of the preferred embodiments of the optical element manufacturing method according to the present invention. It is to be noted that in the specification and the drawings, the same reference numerals are assigned to components having functions and structural features substantially identical to one another to preclude the necessity for a repeated explanation thereof.

First Embodiment

Figure 2A:
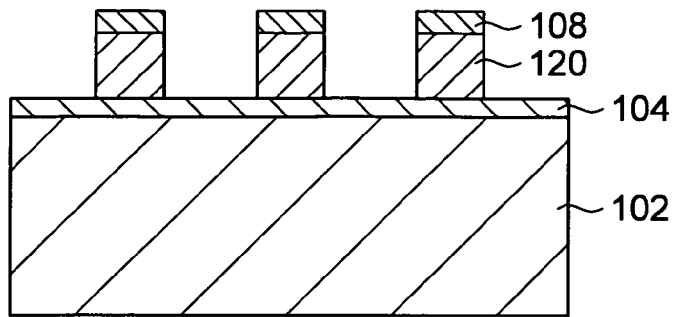
FIG. 2 illustrates the optical element manufacturing method achieved in the First embodiment.
Figure 2B:
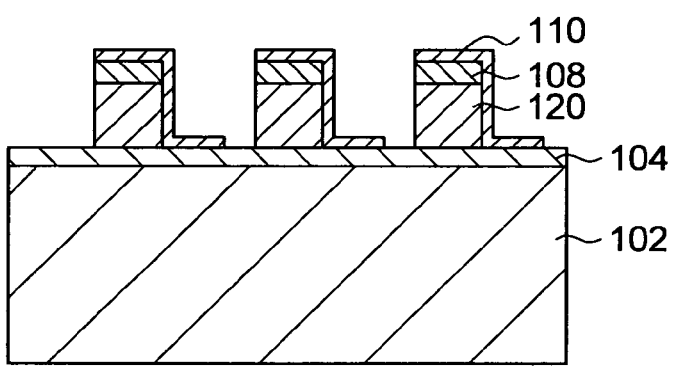
Figure 2C:
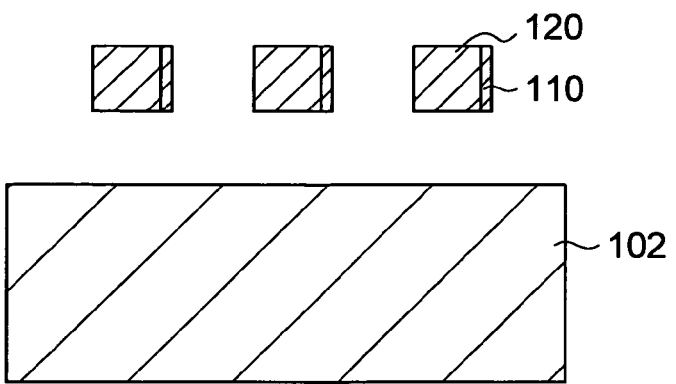
Figure 3:
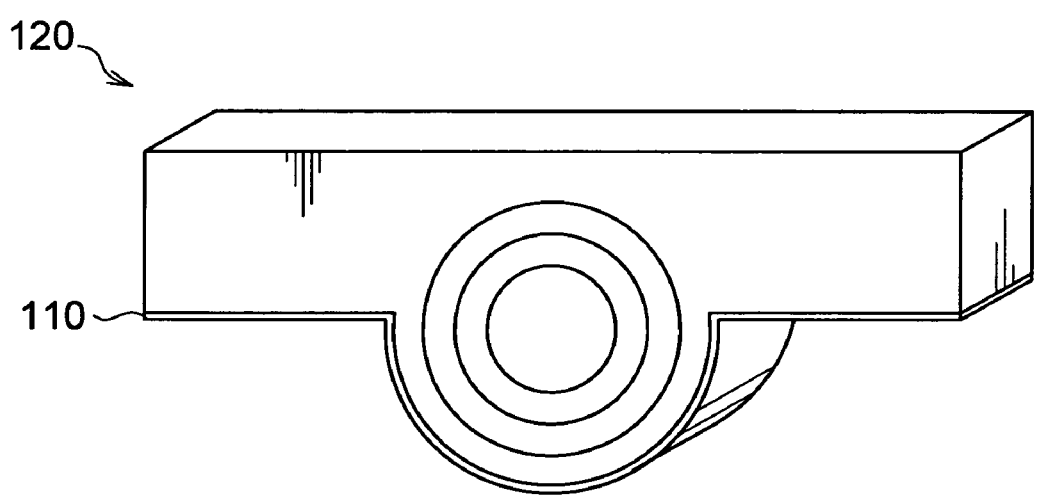
FIG. 3 shows a lens element.

In reference to FIGS. 1 through 3, the first embodiment of the optical element manufacturing method according to the present invention is explained. In reference to the embodiment, a specific method through which a metal film is formed at the side wall of each lens element (microlens) is explained. It is to be noted that to facilitate the explanation, the thicknesses of the substrates, the layers or the films in the figures are exaggerated and that they do not necessarily match the actual thicknesses.

First, as shown in FIG. 1(a), an oxide layer 104 constituted with a silicon oxide film is formed on a supporting layer 102 constituted with a silicon substrate. The oxide layer 104 is used in a subsequent step as an etch stopper. Then, a device-forming layer 106 constituted with a silicon substrate (an SOI substrate) is formed atop the oxide layer 104. Lens elements are formed by using the device-forming layer 106 in a subsequent step. The device-forming layer 106 is formed so as to achieve a thickness substantially equal to the thickness of the lens elements along the optical axis to be ultimately achieved through the steps to be explained later.

In addition, n×m lens portions 106a are formed over regular intervals at the upper surface of the device-forming layer 106. It is to be noted that only three lens portions 106a are shown in the figure for purposes of simplifying the illustration. The lens portions 106a can each be formed as a fresnel lens assuming a staged shape. A fresnel lens can be formed by alternately executing a photolithography step and an etching step several times.

Next, the lens elements are processed so as to achieve a specific external shape. A resist applied onto the device forming layer 106 through photolithography is patterned so as to match the lens element shape to be achieved and the resist pattern is transferred onto the device forming layer 106 by using the resist as a dry etching mask, thereby forming lens elements 120 with the external shape shown in FIG. 1(b). The dry etching process may be executed by adopting the RIE method or the ICP-Bosch method (silicon deep-etching process). The device-forming layer 106 that is patterned through this process is constituted with an SOI substrate, and it is etched as far down as to the oxide layer 104 through, for instance, the ICP-Bosch method.

Figure 1B:
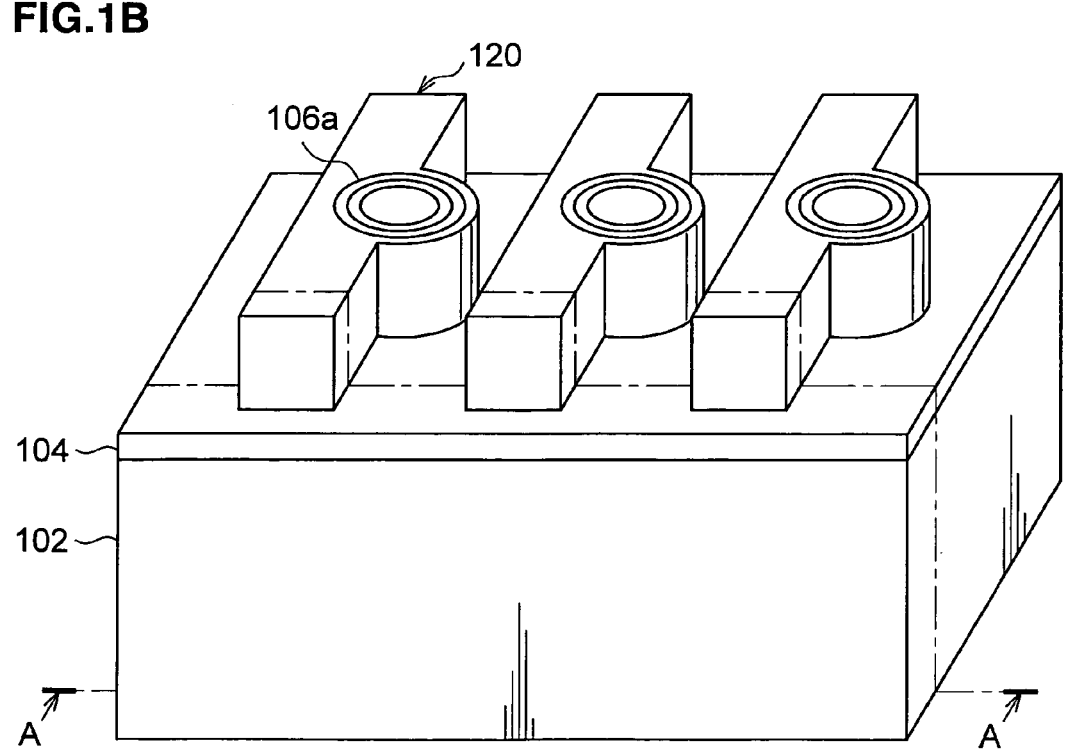

Through the steps described above, a microlens array (only three lens elements 120 are shown in FIG. 1(b)) is formed on the supporting layer 102, as shown in FIG. 1(b).

FIG. 2(a) is a sectional view taken along A-A in FIG. 1(b). An oxide layer 108 constituted with a silicon oxide film, which is to be used to prevent any metal (solder connection metal) from becoming adhered to the lens portions 106a during subsequent steps, is formed over a thickness of approximately 1 μm through the CVD method by using tetraethoxysilane (TEOS) at the top surface of each lens element 120. It is to be noted that such an oxide layer 108 may instead be formed as a silicon oxide film with a thickness of approximately 0.2 μm through sputtering, and the subsequent process is executed in exactly the same way in conjunction with the oxide layer formed through sputtering.

(Vapor Deposition Step)

As shown in FIG. 2(b), a solder metal film 110 is vapor-deposited through ion plating in a batch at the sidewalls of the plurality of lens elements 120. The solder connection metal film 110 used in the embodiment adopts a two-layer structure detailed below.

(1) Cu (0.2 μm)/Ni (0.1 μm)

(2) Ni 80 Cr 20 (0.2 μm)/Ni (0.1 μm)

Next, the oxide layers 104 and 108 are removed from the silicon substrate by using a hydrofluoric acid solution (HF solution) and thus, the individual lens elements (microlenses) 120 are formed as shown in FIG. 2(c). FIG. 3 illustrates the structure of a lens element 120 achieved in the embodiment. The lens element 120 has a thickness of approximately 100 μm. At a sidewall of the lens element 120, the solder connection metal film 110 is formed.

Advantages of the First Embodiment

As explained above, the solder connection metal film 110 can be formed with ease at the sidewalls of the lens elements 120 by adopting the embodiment. The lens elements 120 with the solder connection metal film formed at the side walls thereof can be bonded through soldering. Namely, when fixing the lens elements 120 onto the supporting substrate, the lens elements can be firmly set on the supporting substrate via the solder.

The solder connection metal film 110 needs to be constituted of a material that demonstrates a sufficiently high level of resistance to the hydrofluoric acid solution (HF solution) used when separating the individual lens elements 120 through the step shown in FIG. 2(c) and also enables solder bonding. The results of the solder bonding test we conducted indicate that the solder connection metal film 110 assures a sufficiently high level of bonding strength for reliable solder connection.

Second Embodiment

An explanation is given in reference to the second embodiment on a method for forming a solder connection metal film at the sidewalls of lens elements through electroless plating.

Figure 4A:
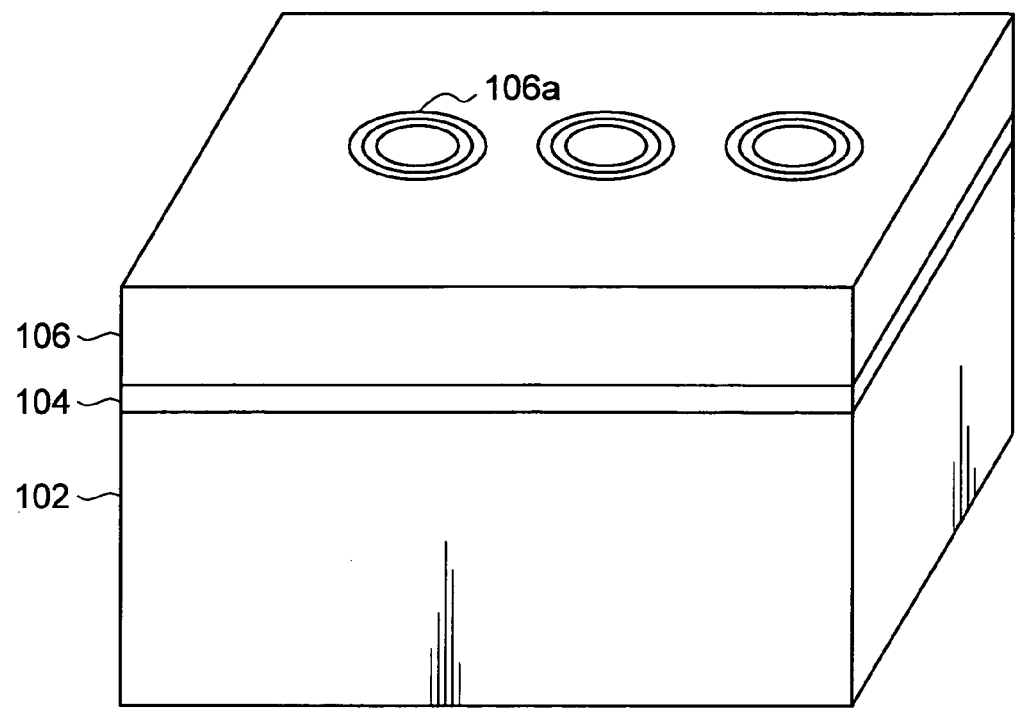
FIG. 4 illustrates the optical element manufacturing method achieved in a second embodiment.
Figure 4B:
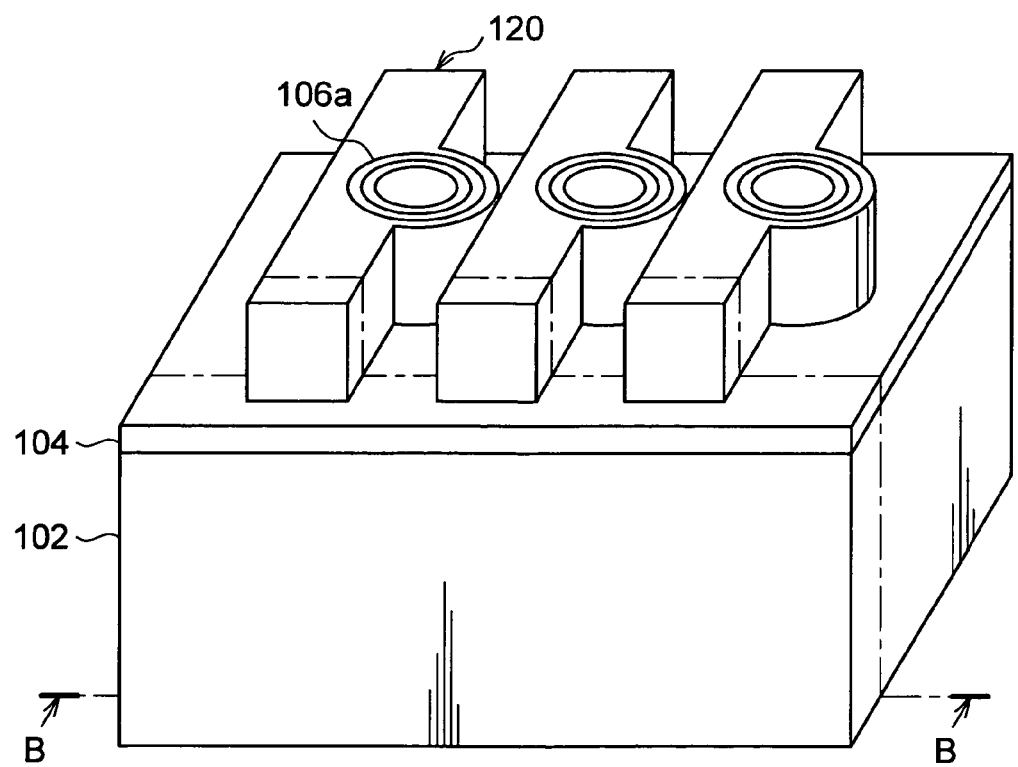

By adopting this embodiment, lens elements 120 can be formed on the supporting layer 102 at high density. Namely, as shown in FIG. 4(a), lens portions 106a can be formed at the upper surface of the device forming layer 106 with smaller intervals compared to the intervals between the lens portions 106 in the first embodiment (see FIG. 1(a)). Then, as shown in FIG. 4(b), lens elements 120 are formed so as to achieve a specific external shape through a method similar to that adopted in the first embodiment. The intervals between lens elements 120 formed next to each other are set so as to allow full penetration of the plating solution used for electroless plating.

Figure 5A:
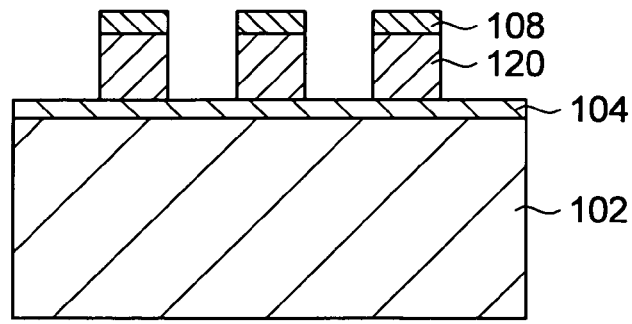
FIG. 5 illustrates the optical element manufacturing method achieved in the second embodiment.
Figure 5B:
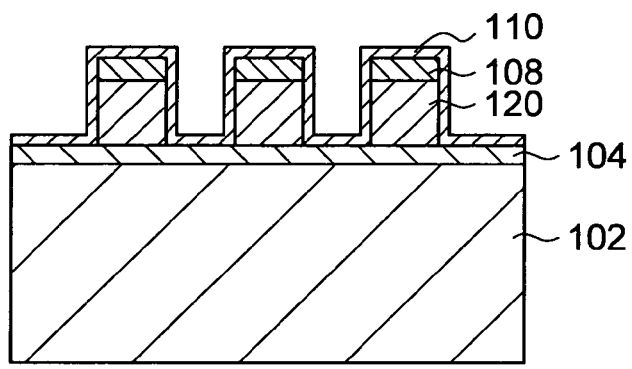

FIG. 5(a) is a sectional view taken along B-B in FIG. 4(b). An oxide layer 108, which is to be used to prevent any metal (solder connection metal) from becoming adhered to the lens portions 106a during subsequent steps, is formed over a thickness of approximately 1 μm through the CVD method at the top surface of each lens element 120.

(Electroless Plating Step)

As shown in FIG. 2(b), a solder metal film 110 is formed through electroless plating in a batch at the sidewalls of the lens elements 120. The solder connection metal film 110 used in the embodiment is constituted of the following metal material.

(1) Cu (0.5 μm)/Ni (0.1 μm)

Figure 5C:
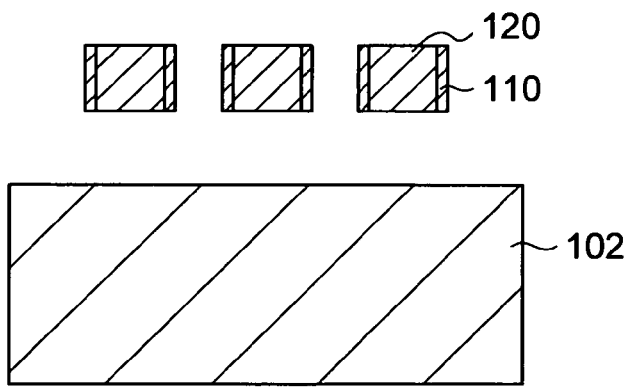

Next, the oxide layers 104 and 108 are removed from the silicon substrate by using a hydrofluoric acid solution (HF solution) and thus, the individual lens elements (microlenses) 120 are formed as shown in FIG. 5(c).

Advantages of the Second Embodiment

As explained above, the lens elements 120 with the solder connection metal film 110 formed at the sidewalls thereof in the embodiment can be bonded through soldering as in the first embodiment. The solder connection metal film 110 is constituted of a material that demonstrates a sufficiently high level of resistance to the hydrofluoric acid solution (HF solution) used when separating the individual lens elements 120 through the step shown in FIG. 5(c) and the results of the solder bonding test we conducted indicate that the solder connection metal film 110 assures a sufficiently high level of bonding strength for reliable solder connection.

In addition, the embodiment in which the solder connection metal film 110 is formed through electroless plating is advantageous in that, the metal film can be formed evenly over the entire side walls and that, as shown in FIG. 4(b), the solder connection metal film 110 can be formed at the side walls of lens elements 120 formed in close proximity to each other as long as the side walls are set over intervals that allow full penetration of the plating solution. Consequently, the lens elements 120 can be formed at the supporting layer 102 at high density.

Third Embodiment

An explanation is given in reference to the third embodiment on a method for forming a solder connection metal film at the sidewalls of lens elements through electrolytic plating.

The supporting layer 102 in FIG. 5(a) used in the embodiment needs to have electrically conductive characteristics so as to enable electrolytic plating. The device-forming layer 106 is constituted with a 0.1Ω·cm substrate in the embodiment.

In addition, as in the second embodiment, lens elements 120 can be formed with high density on the supporting layer 102 in the embodiment. Namely, as shown in FIG. 4(a), lens portions 106a can be formed at the upper surface of the device forming layer 106 with smaller intervals compared to the intervals between the lens portions 106a in the first embodiment (see FIG. 1(a)). Then, as shown in FIG. 4(b), lens elements 120 are formed so as to achieve a specific external shape through a method similar to that adopted in the first embodiment. The intervals between lens elements 120 formed next to each other are set so as to allow full penetration of the plating solution used for the electrolytic plating.

Figure 6A:
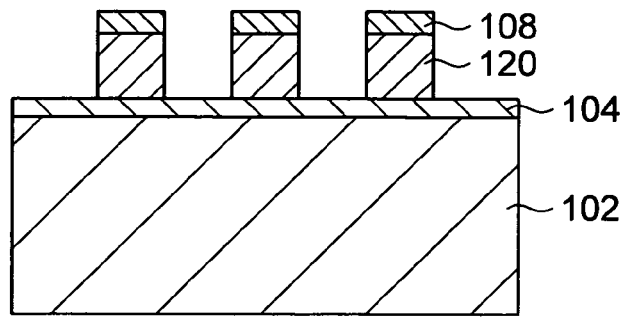
FIG. 6 illustrates the optical element manufacturing method achieved in a third embodiment.

FIG. 6(a) is a sectional view taken along B-B in FIG. 4(b). An oxide layer 108, which is to be used to prevent any metal (solder connection metal) from becoming adhered to the lens portions 106a during subsequent steps, is formed over a thickness all of approximately 1 μm through the CVD method at the top surface of each lens element 120.

(Electrolytic Plating Step)

Figure 6B:
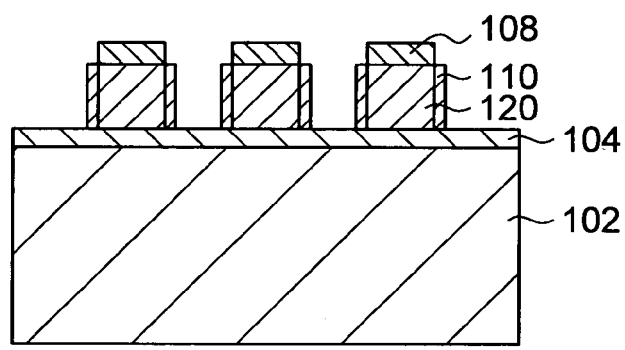
Figure 6C:
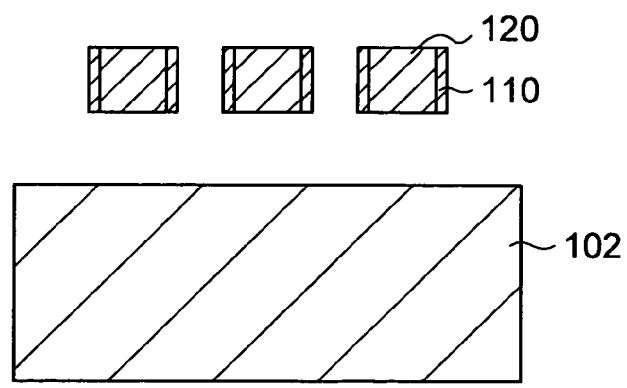

As shown in FIG. 6(b), a solder metal film 110 is formed through electroless plating in a batch at the sidewalls of the lens elements 120. Since the sidewalls of the lens elements 120 in the embodiment are electrically conductive, the solder connection metal film 110 is formed only at the sidewalls of the lens elements, as shown in FIG. 6(c). The solder connection metal film 110 used in the embodiment is constituted of the following metal material.

(1) Cu (0.5 µm)/Ni (0.2 µm)

Next, the oxide layers 104 and 108 are removed from the silicon substrate by using a hydrofluoric acid solution (HF solution) and thus, the individual lens elements (microlenses) 120 are formed as shown in FIG. 6(c).

Advantages of the Third Embodiment

As explained above, the lens elements 120 with the solder connection metal film 110 formed at the sidewalls thereof in the embodiment can be bonded through soldering as in the first embodiment. The solder connection metal film 110 is constituted of a material that demonstrates a sufficiently high level of resistance to the hydrofluoric acid solution (HF solution) used when separating the individual lens elements 120 through the step shown in FIG. 6(c), and the results of the solder bonding test we conducted indicate that the solder connection metal film 110 assures a sufficiently high level of bonding strength for reliable solder connection.

In addition, the embodiment, in which the solder connection metal film 110 can be formed evenly only over the areas where a current flows as shown in FIG. 6(b), achieves advantages in that the extent to which the lens elements 120 are affected by the presence of the solder connection metal film 110 is minimized and in that, as shown in FIG. 4(b), the solder connection metal film 110 can be formed at the side walls of lens elements 120 formed in close proximity to each other as long as the side walls are set over intervals that allow penetration of the plating solution. Consequently, the lens elements 120 can be formed at the supporting layer 102 with high density.

Fourth Embodiment

In reference to the fourth embodiment, an explanation is given on a method through which lens elements manufactured through a method adopted in any of the first through third embodiments are mounted on to a supporting substrate having a V-shaped groove formed thereupon (hereafter referred to as a V-shaped groove substrate) through post processing steps following the procedure executed as explained in reference to the first through third embodiments. In the embodiment, lens elements are mounted in a batch at the V-shaped groove substrate which is an uncut 4-inch silicon wafer.

Figure 7:
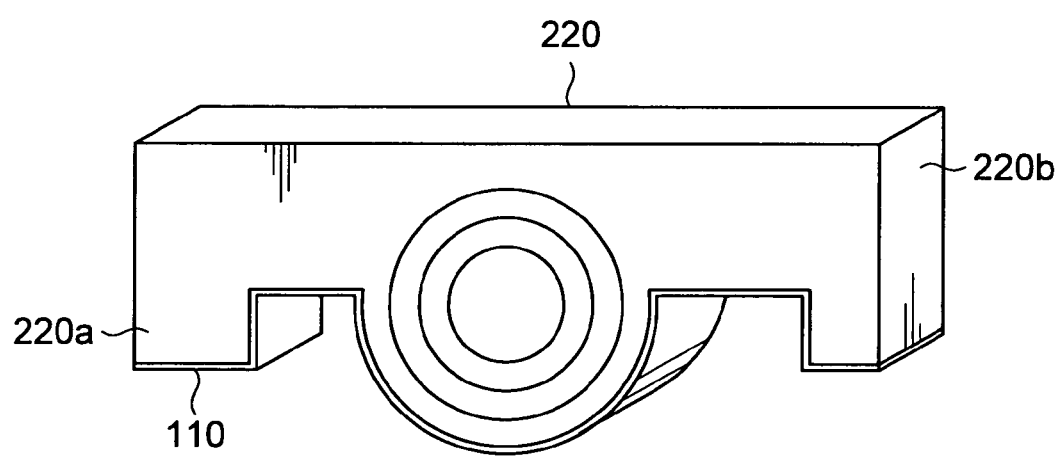
FIG. 7 shows the lens element with fix portions formed thereat.

FIG. 7 illustrates a lens element 220 to be mounted at the supporting substrate in the embodiment.

The lens element 220 achieved in the embodiment includes fix portions 220a and 220b used to mount the lens element at a V-shaped groove substrate 300 in a post-processing step. The fix portions 220a and 220b assume shapes that make the lens element left/right asymmetrical, as shown in FIG. 7. The fix portions 220a and 220b can be formed to assume such shapes during the step shown in FIG. 1(b) for forming the lens element 120 to achieve a specific external shape by forming a specific pattern at the resist and executing the subsequent steps, as has been explained in reference to any of the first through third embodiments.

In addition, the solder connection metal film 110 is formed at the sidewall of the lens element 220, as has been explained in reference to the first through third embodiments. For instance, at the sidewall of the lens element 220 having been formed by adopting the first embodiment, a Cu (0.2 µm)/Ni (0.1 µm) film will have been formed.

Figure 8:
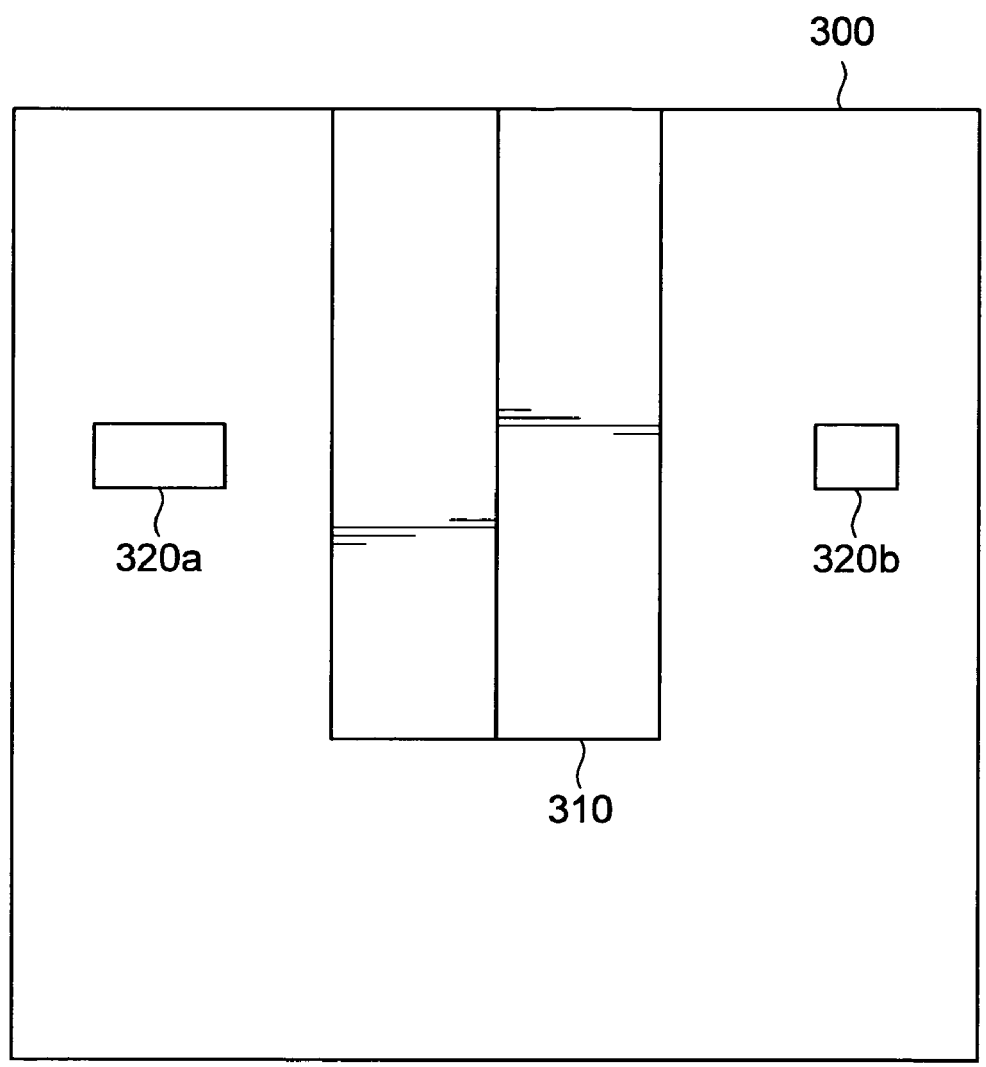
FIG. 8 illustrates a substrate with a V-shaped groove.

FIG. 8 illustrates the V-shaped groove substrate 300 at which the lens element 220 is to be mounted.

At the V-shaped groove substrate 300, a V-shaped groove 310 at which the lens portion of the lens element 220 is to be mounted and fixing grooves 320a and 320b at which the fix portions 220a and 220b of the lens element 220 are to be fitted are formed.

As shown in FIG. 8, the fixing grooves 320a and 320b at the V-shaped groove substrate 300 assume shapes that make them asymmetrical, so as to match the shapes of the fix portions 220a and 220b at the lens element 220. Solder is formed through vacuum deposition at the fixing grooves 320a and 320b. For instance, if a Cu (0.2 µm)/Ni (0.1 µm) film is formed at the side wall of the lens element 220, solder constituted of a material containing Sn 95.5 Ag 4.0 Cu 0.5 may be formed through vacuum deposition at the fixing grooves 320a and 320b of the V-shaped groove substrate 300.

Lens elements 220 (e.g., approximately 2000 lens elements) having been separated from one another are scattered into ethanol (e.g., approximately 100 mL). This solution containing the lens elements 220 is poured onto the V-shaped groove substrate 300 in a tilted state (e.g., with an angle of inclination of approximately 20°). The solution circulates (e.g., for approximately 10 minutes) while the solution, together with the lens elements 220 in it flows continuously.

Due to the in-solution self-alignment effect, the lens elements 220 can be disposed, each on a V-shaped groove 310 and the corresponding fixing grooves 320a and 320b at the V-shaped groove substrate 300. Since the fixing grooves 320a and 320b at the V-shaped groove substrate 300 and the fix portions 220a and 220b of the lens elements 220 are formed to be left/right asymmetrical, the lens elements 220 can each be set accurately by preventing erroneous back-to-front placement of the lens elements 220.

The V-shaped groove substrate 300 with the lens elements 220 thus mounted is then held in a heating furnace sustaining a specific temperature over a predetermined length of time (e.g., 3 minutes in a heating furnace sustained at 275° C.). After the substrate is taken out of the furnace and allowed to cool down, it can be checked to ensure that the lens elements 220 have become firmly fixed. After the lens elements 220 have become completely fixed, the V-shaped groove substrate 300 is cut at specific positions, thereby completing the process of manufacturing an optical element module at which the lens elements 220 are mounted.

Advantages of the Fourth Embodiment

The embodiment described above, in which the fix portions 220a and 220b at the lens elements 220, as well as the fixing grooves 320a and 320b at the V-shaped groove substrate 300, assume shapes which make them asymmetrical, achieves an advantage in that lens elements 220 can be disposed and fixed in a batch with accuracy through the in-solution self alignment effect by preventing an erroneous back-to-front placement of the individual lens elements.

While the invention has been particularly shown and described with respect to preferred embodiments of the optical element manufacturing method according to the present invention by referring to the attached drawings, the present invention is not limited to these examples and it will be understood by those skilled in the art that various changes in form and detail may be made therein without departing from the spirit, scope and teaching of the invention.

For instance, while the lens portions 106a are each formed as a fresnel lens, assuming a staged shape in the embodiments described above, micro optical elements of different types including refractive optical elements may be formed through the LSI process.

While the solder connection metal film 110 adopts a two-layer structure in an embodiment described earlier, the solder connection metal film may adopt a multiple layer structure with three or more metal layers or a single metal layer structure, as long as the metal film achieves a sufficiently high level of resistance to hydrofluoric acid processing. While a silicon substrate is used as the base substrate when forming the microlens array in the embodiments, a substrate such as a GaAs substrate may be used instead, as long as it is optically transparent and is in a communication wavelength band.

While the lens elements are each connected to the lens supporting substrate at two positions along the horizontal direction, it may instead be mounted on a single side, i.e., at a single position, so as to allow easy distinction between the front side and the rear side of the lens element.

As explained above, the solder connection metal film can be formed with ease at the sidewalls of the lens elements by adopting the present invention. The lens elements with the solder connection metal film formed at the side walls thereof can be bonded through soldering. Namely, when fixing the lens elements onto the supporting substrate, the lens elements can be firmly set on the supporting substrate via the solder.

The present invention may be adopted in a method for manufacturing optical elements to be used in communication devices or computers.

What is claimed is:

1. An optical element manufacturing method, comprising:
    forming a lens element comprising
        forming a first silicon oxide film on a first silicon substrate,
        forming a second silicon substrate on the first silicon oxide film,
        forming a lens portion at an upper surface of the second silicon substrate, and
        etching the second silicon substrate to form the lens element;
    coating a solder connection metal onto side surfaces of the lens element; and
    separating the lens element by removing the first silicon oxide film.

2. An optical element manufacturing method according to claim 1, wherein: the solder connection metal comprises a metal that is not corroded by hydrofluoric acid.

3. An optical element manufacturing method according to claim 1, wherein: the coating step is executed by a vapor depositing the solder connection metal.

4. An optical element manufacturing method according to claim 3, wherein: the solder connection metal deposited through vapor deposition comprises Cu (0.2 µm)/Ni (0.1 µm) and Ni 80 Cr 20 (0.2 µm)/Ni (0.1 µm).

5. An optical element manufacturing method according to claim 1, wherein: the coating step is executed by forming the solder connection metal through electroless plating.

6. An optical element manufacturing method according to claim 5, wherein: the solder connection metal film formed through electroless plating comprises Cu (0.5 µm)/Ni (0.1 µm).

7. An optical element manufacturing method according to claim 1, wherein: the coating step is executed by forming the solder connection metal through electrolytic plating.

8. An optical element manufacturing method according to claim 7, wherein: the solder connection metal film formed through electrolytic plating comprises Cu (0.5 µm)/Ni (0.2 µm).

9. An optical element manufacturing method according to claim 1, further comprising:
    forming at a supporting substrate fixing grooves at which the lens element is fixed;
    forming solder at the fixing grooves; and
    fixing the lens element at the fixing grooves, wherein: fix portions having a shape matching the shape of the fixing grooves are formed at the lens elements during the lens element forming step.

10. An optical element manufacturing method according to claim 9, wherein:
    fixing the lens element includes immersing the lens element and the fixing grooves at the supporting substrate in a solution, wherein the fix portions of the lens element become fixed at the fixing grooves through in-solution self alignment.

11. An optical element manufacturing method according to claim 9, wherein:
    the fix portions of the lens element are formed asymmetrically relative to a center of the lens element.

12. An optical element manufacturing method comprising:
    forming a lens element comprising
        forming a first silicon oxide film on a first silicon substrate, and
        forming the lens element at an upper surface of the first silicon oxide film;
    forming a second silicon oxide film at an upper surface of the lens element;
    coating a solder connection metal onto side surfaces of the lens element; and
    separating the lens element by removing the first silicon oxide film and the second silicon oxide film.

13. An optical element manufacturing method according to claim 12, wherein: the solder connection metal comprises a metal that is not corroded by hydrofluoric acid.

14. An optical element manufacturing method according to claim 12, wherein: the coating step is executed by a vapor depositing the solder connection metal.

15. An optical element manufacturing method according to claim 14, wherein: the solder connection metal deposited through vapor deposition comprises Cu (0.2 µm)/Ni (0.1 µm) and Ni 80 Cr 20 (0.2 µm)/Ni (0.1 µm).

16. An optical element manufacturing method according to claim 12, wherein: the coating step is executed by forming the solder connection metal through electroless plating.

17. An optical element manufacturing method according to claim 16, wherein: the solder connection metal film formed through electroless plating comprises Cu (0.5 µm)/Ni (0.1 µm).

18. An optical element manufacturing method according to claim 12, wherein: the coating step is executed by forming the solder connection metal through electrolytic plating.

19. An optical element manufacturing method according to claim 18, wherein: the solder connection metal film formed through electrolytic plating comprises Cu (0.5 µm)/Ni (0.2 µm).

20. An optical element manufacturing method according to claim 12, further comprising:
    forming at a supporting substrate fixing grooves at which the lens element is fixed;

forming solder at the fixing grooves; and fixing the lens element at the fixing grooves, wherein: the fix portions having a shape matching the shape of the fixing grooves are formed at the lens elements during the lens element forming step.

21. An optical element manufacturing method according to claim 20, wherein:

fixing the lens element includes immersing the lens element and the fixing grooves at the supporting substrate in a solution, wherein the fix portions of the lens element become fixed at the fixing grooves through in-solution self alignment.

22. An optical element manufacturing method according to claim 20, wherein:

the fix portions of the lens element are formed asymmetrically relative to a center of the lens element.

* * * * *

UNITED STATES PATENT AND TRADEMARK OFFICE
CERTIFICATE OF CORRECTION

PATENT NO. : 7,585,422 B2
APPLICATION NO. : 11/374117
DATED : September 8, 2009
INVENTOR(S) : Maeno et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 803 days.

Signed and Sealed this

Fourteenth Day of September, 2010

David J. Kappos
*Director of the United States Patent and Trademark Office*